UNITED STATES PATENT OFFICE.

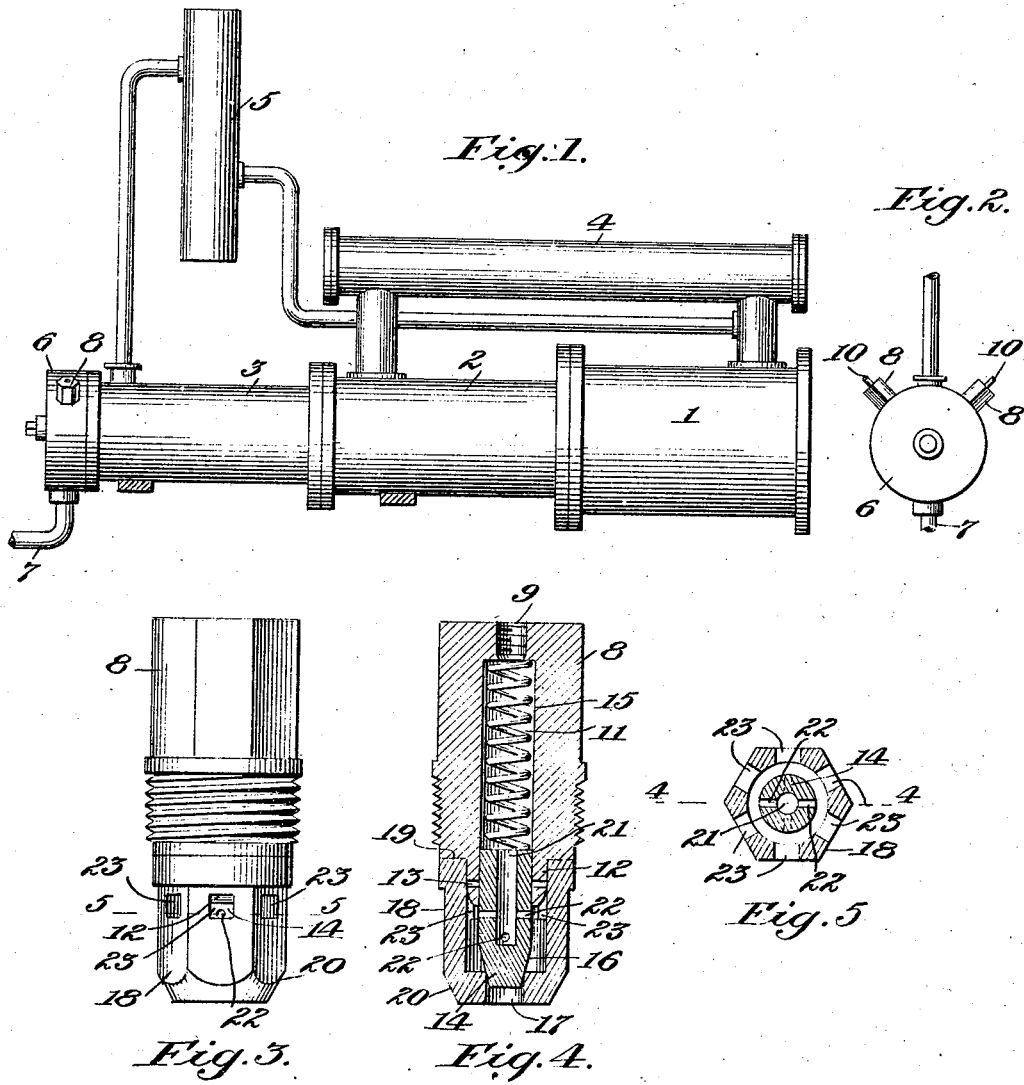

ERNEST L. HEWLETT, OF NORFOLK, VIRGINIA.

DISCHARGE VALVE FOR AIR COMPRESSORS.

1,420,429.  Specification of Letters Patent.  Patented June 20, 1922.

Application filed February 2, 1921. Serial No. 441,871.

*To all whom it may concern:*

Be it known that I, ERNEST L. HEWLETT, residing at Norfolk, in the county of Norfolk and State of Virginia, a citizen of the United States, have invented certain new and useful Improvements in Discharge Valves for Air Compressors, of which the following is a specification.

This invention is a valve for controlling the discharge from gas compressors and has for its object the provision of a simple and inexpensive device whereby the compressed air or gas will be permitted to escape, back flow of high pressure gas into the compressor will be prevented, the valve will automatically reseat after each discharge in such a manner as to make regrinding of the valve or its seat unnecessary, and lubrication of the valve will be accomplished.

The invention is illustrated in the accompanying drawings and will be hereinafter fully set forth.

In the drawings:—

Fig. 1 is an elevation of the position of the device upon a conventional multi-stage air-compressor, Fig. 2 is an end view of the same, Fig. 3 is an elevation of the valve detached from the compressor, Fig. 4 is a longitudinal section of the valve, Fig. 5 is a transverse section on the line 5—5 of Fig. 3, the line 4—4 on Fig. 5 indicating the plane of the section shown in Fig. 4.

The compressor illustrated comprises a low pressure cylinder 1, an intermediate pressure cylinder 2, a high pressure cylinder 3, a cooler 4, and separator 5, through which the air or other gas passes in flowing from the low and intermediate pressure cylinders to the high pressure cylinder, a discharge head 6 secured over the discharge end of the high pressure cylinder, and an outlet 7 leading from the discharge head to a storage tank or a circulating system.

Threaded into the wall of the head 6 is a valve bonnet 8 which is provided exteriorly with flat faces or sides whereby it may be readily engaged by a turning tool. Two or more of the valves may be employed and the size of the valves will be determined by the capacity of the compressor or other controlling circumstances. Each bonnet is provided at its outer end with an opening 9 in which may be secured the stem of an oil cup or the end of an oil-conveying pipe 10. The bore 11 of the bonnet extends from the oil opening 9 through a reduced extension or sleeve 12 on the inner end of the bonnet, vent openings 13 being formed through the side wall of the extension as shown in Fig. 4. The valve body 14 is essentially a plug of circular cross section fitting snugly but slidably through the bonnet extension or sleeve 12 and held normally projected by a spring 15 housed in the bore of the bonnet. The upper or outer end of the plug is flat to provide a sufficient footing for the end of the spring but its lower end is tapered, as shown at 16, to readily seat in the upper end of the inlet opening 17 which is provided in the lower end of a discharge chamber body 18. The bonnet is provided with an annular shoulder 19 around the extension 12 and the upper end of the body 18 is smooth so as to form a ground joint with said shoulder, the lower end 20 of said body being tapered or beveled and also smooth so as to form a ground joint with a port of the high pressure cylinder or the head 6. The plug 14 has a central longitudinal socket or cavity 21 opening through its upper end but terminating short of its lower end, and upper and lower minute vent openings 22 are formed through the plug valve in communication with the bore and adapted to register at times with the vents 13 in the bonnet extension. Outlets or discharge openings 23 are provided in the wall of the discharge chamber body to permit the compressed air or gas to escape to the outlet 7 of the head.

When the bonnet is turned home in the wall of the compressor head 6, the body 18 is clamped securely between the bonnet and the outlet port of the compressor head, the ground joints preventing leakage without the use of packing. When the pressure upon the plug valve through the port 17 exceeds the tension of the spring 15, the valve is unseated and the accumulated compressed air or gas flows to and through the outlets 23. When the operation of the compressor is stopped, the valve automatically reseats itself and prevents back flow of the high pressure gas into the low pressure stages. The vents 13 and 22 are so minute that waste of the lubricating oil and flooding of the discharge chamber does not occur but a flow of oil sufficient to effect thorough lubrication is effected. The heat of the compressed gas, furthermore, is sufficient to burn nearly all the oil passing through the vents so that the accumulation of oil in the chamber of the body 18 is practically negligible. Moreover, use of the device has demonstrated that the plug valve wears its seat evenly and will always fit perfectly thereon. The plug valve seems to have a rotary movement which I attribute to the agitation or velocity of the compressed gas as it flows through the port 17 and bears upon the plug valve. The provision of upper and lower vents in the valve, disposed at right angles to each other, serves to balance the valve so that it will slide easily and evenly in the operation of the device. The device is obviously simple and inexpensive and has demonstrated high efficiency. It may be readily applied to any compressor having a detachable discharge head.

Having thus fully described my invention what I claim as new and desire to secure by Letters Patent of the United States is:—

1. A device for the purpose set forth comprising a bonnet having an extension at its inner end, a discharge chamber fitting around said extension and making a ground joint with the bonnet, said chamber having outlets in its side and an inlet in its end, a plug valve slidably mounted in the bonnet extension and seating in the inlet of the discharge chamber, and means within the bonnet for yieldably holding the valve seated.

2. A device for the purpose set forth comprising a bonnet having an extension at its inner end and provided with a lateral vent through the side of said extension, a discharge chamber fitted closely to the end of the bonnet around said extension and having outlets in its side substantially in the plane of the extremity of the extension and having an inlet in its inner end, a plug valve slidably fitted in the bonnet and the extension thereof and having a tapered outer end seating in the inlet of the discharge chamber, said valve having an axial cavity opening through its upper end and transverse vents communicating with said cavity.

3. A device for the purpose set forth comprising a bonnet, a discharge chamber contacting with the end of said bonnet, said chamber having an outlet and an inlet, a plug valve slidably mounted in the bonnet and seating in the inlet of the discharge chamber, and means within the bonnet for yieldably holding the valve seated, the inner end of the plug valve being tapered, said valve unseating under pressure of the discharging fluid.

4. A device for the purpose set forth comprising a bonnet, a discharge chamber contacting with the end of said bonnet, said chamber having an outlet and an inlet, a plug valve slidably mounted in the bonnet and seating in the inlet of the discharge chamber, and means within the bonnet for yieldably holding the valve seated, the inner end of the plug valve being tapered and cooperating with an untapered sharp edge on the valve seat in the inlet of the discharge chamber, said valve unseating under pressure of the discharging fluid.

In testimony whereof I hereunto affix my signature.

ERNEST L. HEWLETT.